United States Patent [19]

Martel Mendez

[11] 4,025,084
[45] May 24, 1977

[54] DEVICE FOR SELF-ORIENTATION OF THE AXIS OF VEHICLES, TRAILERS AND SEMI-TRAILERS

[76] Inventor: Jose Jeronimo Martel Mendez, Concha Espina No. 12, Madrid, Spain

[22] Filed: July 25, 1975

[21] Appl. No.: 598,939

[30] Foreign Application Priority Data

July 27, 1974 Spain .................................. 204930
Apr. 29, 1975 Spain .................................. 211978

[52] U.S. Cl. ............................. 280/141; 280/81 A; 280/676
[51] Int. Cl.² ......................................... B60P 9/00
[58] Field of Search .......... 280/676, 686, 140, 141, 280/142, 432, 81 A, 86

[56] References Cited

UNITED STATES PATENTS

| 2,295,084 | 9/1942 | Keehn | 280/686 |
| 2,631,043 | 3/1953 | Shaffer | 280/676 |
| 2,823,926 | 2/1958 | Stover | 280/676 |
| 3,632,129 | 1/1972 | Bear | 280/140 |
| 3,895,827 | 7/1975 | Padrick | 280/432 |

FOREIGN PATENTS OR APPLICATIONS 550,552   9/1956   France .............................. 280/686

Primary Examiner—Joseph F. Peters, Jr.
Assistant Examiner—John A. Carroll
Attorney, Agent, or Firm—Imirie, Smiley & Linn

[57] ABSTRACT

Self-orientation apparatus for a vehicle having a dual wheel axle assembly wherein the rear axle is movable relative to the vehicle frame about a pivot axis centrally disposed in front of the rear axis. A pair of low-friction skids between the axle and each rear spring allow relative movement therebetween, and first and second pairs of converging arms extend from the base of the springs and the axle, respectively, and converge at said pivot axis where the two pairs of arms are joined by a trunnion.

8 Claims, 11 Drawing Figures

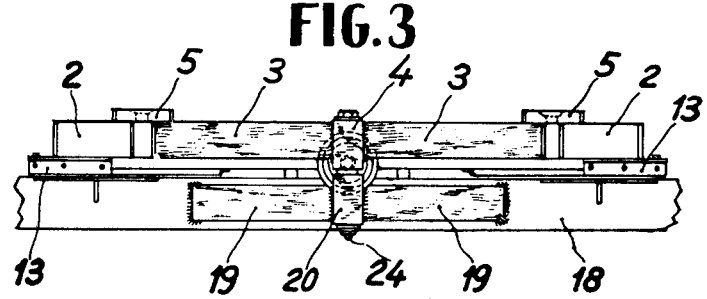
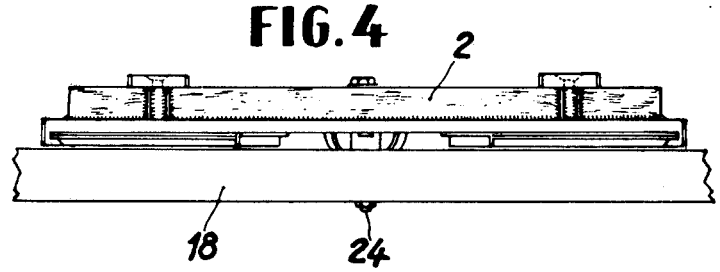
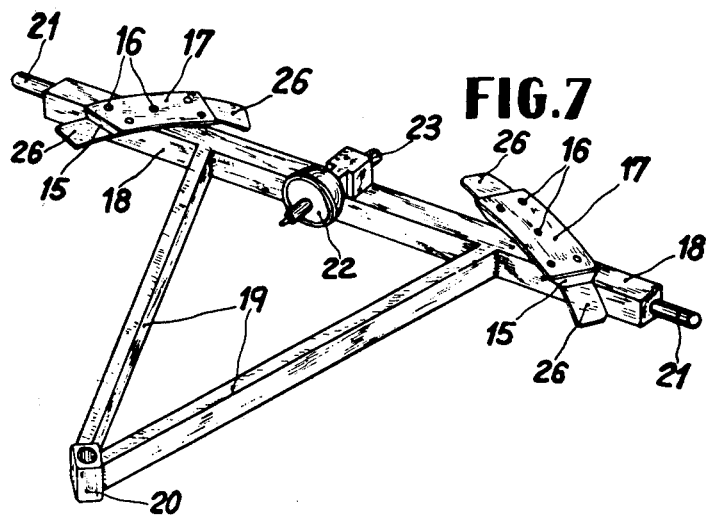

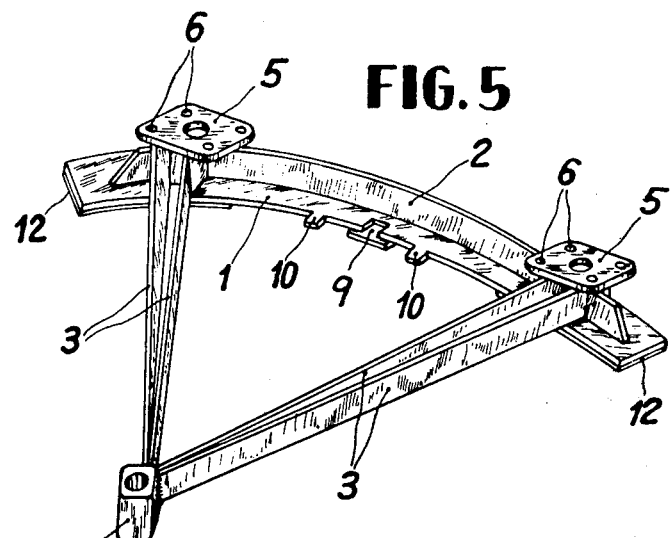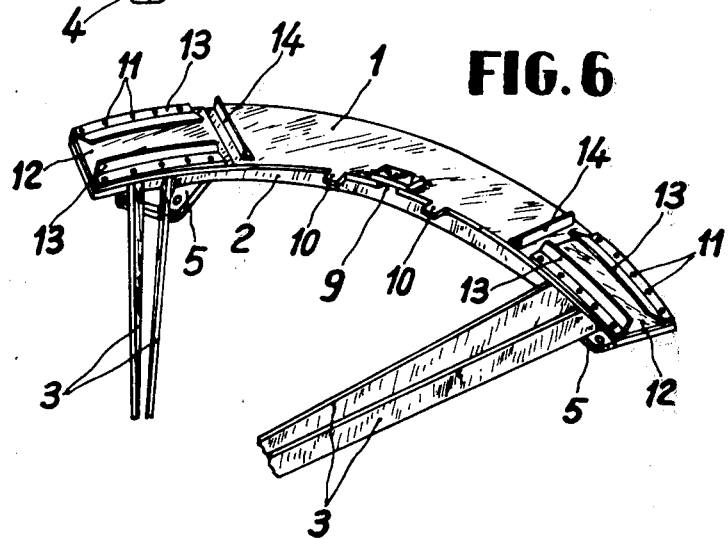

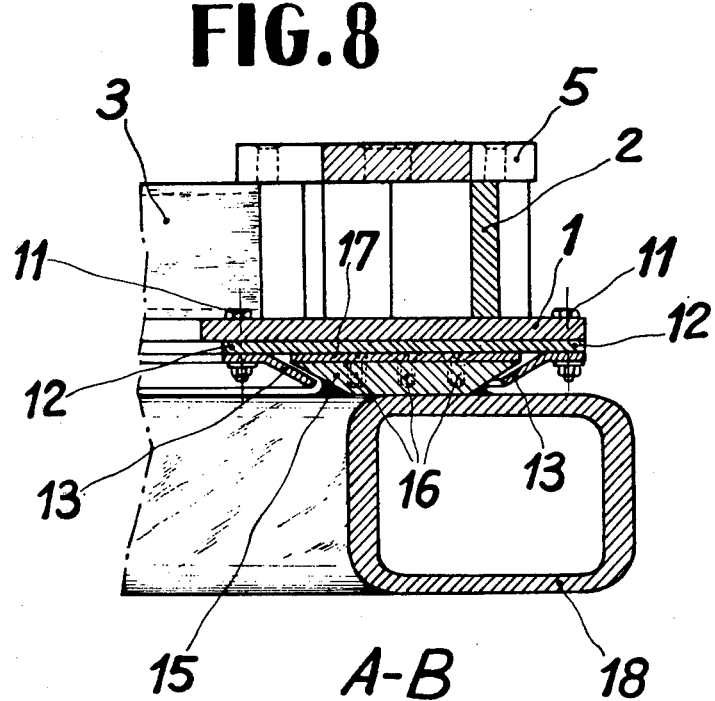
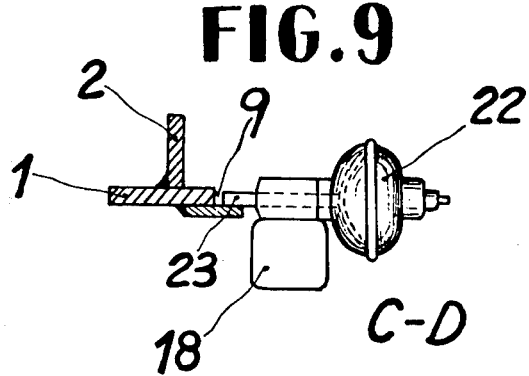

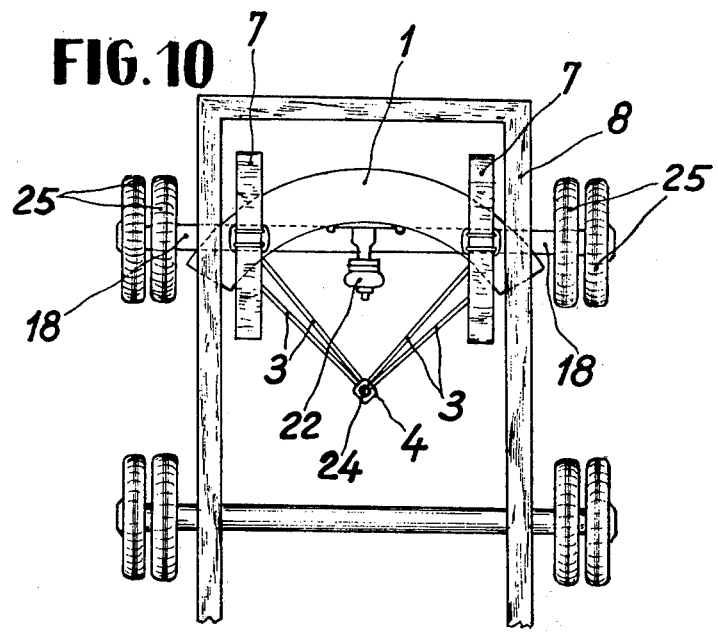
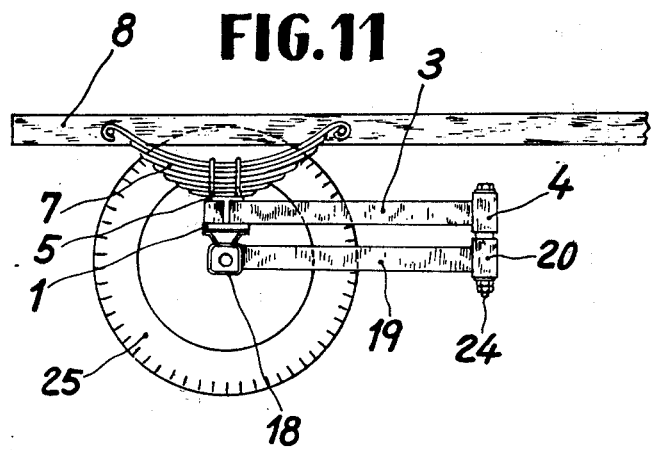

DEVICE FOR SELF-ORIENTATION OF THE AXIS OF VEHICLES, TRAILERS AND SEMI-TRAILERS

BACKGROUND OF THE INVENTION

Vehicles in the nature of trucks, trailers and semi-trailers, which have two or more wheel axles, exhibit the disadvantage that when they reach a turn or curve, they tend to skid due to their length and the fact that the tandem rear axles cannot move relative each other to adapt themselves to the radius formed by the curve of the road. As a result, control of the vehicle in such conditions is very difficult and requires the driver to pay great attention and make considerable effort to avoid accidents. In addition to the skidding caused by the rear wheels, excessive wear of the rear tires is produced as well as overheating, which further damages the tires and considerably reduces their service life while presenting an increased safety risk.

SUMMARY OF THE INVENTION

One of the aims of the invention is to eliminate the disadvantages above mentioned by providing the axles of the non-driving and non-steering wheels of trucks, trailers and semi-trailers, with means for their self-orientation of self-steering, so that they can follow the radius of a curve formed in a paved roadway, thus enabling full control of the vehicle and at the same time avoiding skidding and excessive tire wear.

Preferably, the invention includes arched plates solidly mounted on the axle of the rear wheels at two points by suitable attachment means such as welding. Attached on top of each of these plates is a friction skid of plastic material, preferably nylon, forming a pair of spaced lower skates on the axle. A pair of arched or bent pieces are disposed above the lower skates and are attached to the vehicle springs. These pieces are referred to as upper skates and cooperatively slide over the lower skates during operation of the vehicle. A first pair of arms extends from the base of each spring to a point centrally disposed in front of the rear axle, and a second pair of arms converge at such point from spaced points under the springs on the axle. The pairs of arms are joined at their converged end by a trunnion held in suitable sockets or journalled blocks.

Another aim of the invention is to provide a pneumatic locking device which selectively fixes the two skates with respect to each other when the vehicle is to be driven backwards, the locking device preventing rotation of the axle. It also prevents both skates from moving away from each other in the vertical direction, thus allowing separation of the wheel axle from the floor of the vehicle.

The accompanying drawings show a preferred embodiment of the present invention, it being intended that the following description be interpreted as illustrative and not in a limiting sense.

BRIEF DESCRIPTION OF THE DRAWINGS

FIG. 3 is a front elevational view of the device of FIG. 1;

FIG. 4 is a rear elevational view of the device of FIG. 1;

FIG. 5 is a perspective view of the top side of the upper skate of FIG. 1;

FIG. 6 is a perspective view of the underside of the skate of FIG. 5;

FIG. 7 is a perspective view of the rear axle and lower skate of FIG. 1;

FIG. 8 is an enlarged sectional view along line A-B of FIG. 1 showing a detail of the slide and friction coupling elements of the skates.

FIG. 9 is a sectional view taken along line C-D of FIG. 1, showing the interlocking device of the present invention;

FIG. 10 is a plan view schematically showing the mounting of the assembly of the present invention on the rear of the frame of the vehicle; and FIG. 11 is a side elevational view of the assembly of FIG. 10.

DETAILED DESCRIPTION OF THE PREFERRED EMBODIMENT

Figure 1:
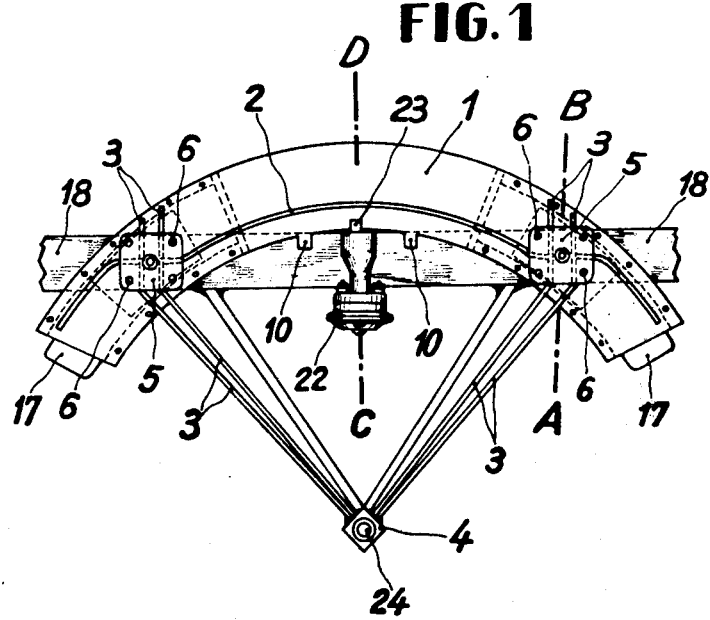
FIG. 1 is a plan view of the assembly according to the present invention, in which the frame and wheels of the vehicle are not shown.
Figure 2:
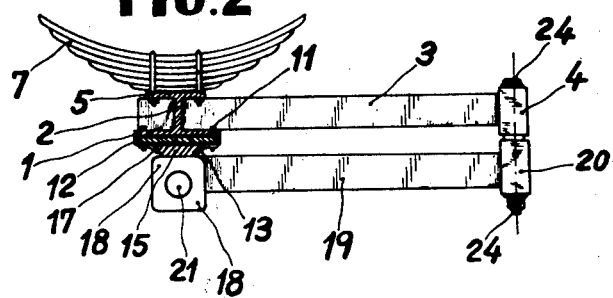
FIG. 2 is a side elevational view of the device shown in FIG. 1.

The present invention includes a thick and rigid plate 1 in the shape of a sector of a circular ring (FIGS. 1 and 2). The ring comprises an upper skate which includes along the center of its upper face another thick plate 2 welded on edge to form a central rib which reinforces the rigidity of the plate and increases its resistance. Also on the upper face of the skate 1 are welded on edge four thick small plates or bars 3 arranged two by two crossing obliquely or transversally the rib 2 and extending convergently to a socket 4. In this manner, bars 3 form a pair of support arms for upper skate 1.

These two pairs of bars 3 may be covered along their lower and upper borders with welded plates (not shown) forming two hollow tie rods. On top of bars 3 where they cross the rib 2, two plates 5 are welded and are provided with holes 6 to which are connected the laminated springs 7 (FIGS. 2 and 11). The springs support the rear portion of the vehicle frame 8 (FIG. 11). In the center of the inner or concave side of skate 1 there is a recess or locking device 9 and two spaced stops or bumpers 10 to be described below.

In the lower face of skate 1 and towards the ends, there are two plates 12 fixed with screws 11 or through any other means and made out of appropriate low friction material. Attached together with same screws 11 are bars 13 which are longitudinally bent at a slight angle to form a means of protection. Near the inner ends of each plate 12 there is another bar 14 of L-shaped section and transversally fixed on the skate 1 so as to constitute a dust guard for the element which slides between bars 13 and upon plates 12.

The device also comprises two cakes or plates 17 of nylon or any other substance, preferably plastic of high hardness and low friction, these plastic plates 17 having an arched shape, like circular ring sectors, and mounted with fixing screws 16 to elongate steel plates 15. Plates 15 also have an arched shape and are disposed like two complementary sectors of a circular ring in fixed attachment to rear wheel axle 18 which they cross obliquely (FIG. 7). There are, in addition, plates 26 which extend past the ends of the friction plates 17 for dust protection.

Attached at spaced points to axle 18 are two arms 19 of inverted U-shaped or other suitable section which converge and are welded or otherwise connected to a socket 20. The wheels 25 of the vehicle are on axle ends 21 (FIGS. 7 and 10).

In the middle of axle 18 there is mounted a pneumatically operated plunger assembly 22 having an internal diaphragm which actuates a shaft or latch 23 designed to lodge in the recess 9 of skate 1 (FIGS. 1, 7 and 9).

The arrangement, mounting and operation of the above described elements is such that skate 1 is attached to the springs 7 and these to the rear lower portion of frame 8 of the vehicle, as shown in FIGS. 10 and 11. Plates 12 of skate 1 rest on the plastic shoes 17, which, together with piece 15 and axle 18 form the lower skate, which is connected articulately to the upper skate by means of a pivot or axle 24 extending between sockets 4 and 20 of the convergent arms of both skates. In this way, the upper and lower skates are horizontally movable relative each other about the trunnion formed by axle 24 and sockets 4 and 20.

When the vehicle moves in a straight line, upper skate 1 on the vehicle frame, pulls the lower skate on the wheel axle 18 since the upper and lower skates are coupled by shoes or skids 17 which are slidably received between members 13 and upon friction plate 12. The central disposition of pivot axle 24 and the symmetrically arranged connecting arms 3 and 19 cause axle to move and become perpendicular to the line of progress of the vehicle. On the other hand, when the vehicle traverses a curve in the road, upper skate 1 on frame 8 will horizontally slide and shift upon lower skate about the axis of pivot axle 24. Thus, axle 18 is not forced to run over the same curve as the vehicle, but places itself somewhat obliquely to the line of progress of said vehicle so that wheels 25 of axle 18 are not caused to skid or be displaced sideways over the paved roadway. Rather, wheels 25 progress by normal rolling motion along a different curve, established by the self-orientation of axle 18, about pivot axle 24 and through connecting arms 3 and 19.

When backing up the vehicle, the driver will actuate, from his cabin, the pneumatic plunger 22, thereby introducing its latching shaft 23 into recess 9 preventing lower skate 17 and its axle 18 from relative movement with respect to upper skate 1. This enables normal operation of the vehicle in reverse, in a conventional manner. The entering of latch 23 into recess 9 fixes and determines the correct position in which axle 18 and its wheels 25 can be raised vertically from the roadway surface, and a plate below recess 9 cooperates with the latch 23 to cause the wheels and axle to be lifted with the vehicle frame.

It should be understood that the above described and represented assembly may be constructed in a variety of sizes and materials, and is subject to many changes, modifications and details, provided that the essentials are not altered from what is stated in the appended claims.

What is claimed is:

1. An improved device for the self-orientation of an axle of a vehicle, comprising first skate means attached to the vehicle, second skate means mounted on the axle, and means interconnecting said first and second skate means to enable horizontal relative movement therebetween and to constrain such movement to an arcuate path; said interconnecting means including a first pair of connecting arms converging from spaced points on said first skate means to a point along the longitudinal center line of the vehicle ahead of the axle in the direction of motion of the vehicle, a second pair of connecting arms converging from spaced points on said second skate means to said center line point, and means pivotally joining said first and second pairs of connecting arms at said center line point for rotation about a vertical axis, the horizontal position of said pivot means being fixed relative to the horizontal positions of said first and second skate means by said first and second pairs of connecting arms independent of the position of the axle relative to the vehicle.

2. An improved device according to claim 1, wherein said first skate means comprises a sector of a circular ring having its center disposed at said center line point, said circular ring sector being centrally disposed with respect to the longitudinal center line of the vehicle; and wherein said second skate means comprises a pair of plates in the shape of circular ring sectors mounted at two spaced points on said one axle equidistant from the geometrical center thereof; said plates having the same radius as said sector of said first skate means, and a pair of plastic plate members each removably attached to one of said pair of plates, respectively.

3. An improved device according to claim 2, wherein said first skate means comprises a plurality of support ribs attached to said circular ring sector for reinforcement thereof, a pair of attachment plates on said support ribs adapted for connection to the vehicle springs, said support ribs and attachment plates being disposed on an upper face of said circular ring sector, and a pair of low friction plates mounted on the lower face of said circular ring sector for cooperation with said second skate means.

4. An improved device according to claim 3, further including pneumatic interlock means on the vehicle for selectively precluding relative horizontal movement between said first and second skate means.

5. An improved device according to claim 4, wherein said pneumatic interlock means comprises a pneumatically actuable plunger assembly mounted on said one axle, and a plunger receiving recess formed in said circular ring sector of said first skate means.

6. An improved device according to claim 5, wherein said pneumatic interlock means further includes means precluding the vertical displacement of said first skate means away from said second skate means whereby jacking of the vehicle frame causes the wheels to be lifted from the roadway.

7. An improved device according to claim 1, wherein said second skate means comprises a pair of steel support plates, a pair of plastic bearing plates, and means for attaching said plastic bearing plates securely to said steel support plates.

8. An improved device according to claim 7, further including interlock means for preventing relative movement between said first and second skate means, said interlock means comprising a notch in said first skate means, a pair of ribs on said first skate means spaced one each on either side of said notch, and an extendable tongue on the axle, said tongue being receivable in said notch to immobilize the axle relative to said first skate means thereby selectively preventing horizontal sliding movement of said first and second skate means relative to each other, said interlock means further including means joining the axle to said first skate means whereby the vehicle wheels may be lifted from the roadway upon jacking of the vehicle frame.

* * * * *